(12) United States Patent
Morden et al.

(10) Patent No.: US 10,587,107 B2
(45) Date of Patent: Mar. 10, 2020

(54) DUAL PROTECTION INNER SEAL WASHER FOR ELECTROMAGNETIC EFFECTS (EME) FASTENERS

(71) Applicant: The Boeing Company, Chicago, IL (US)

(72) Inventors: Sean D. Morden, Federal Way, WA (US); Peter A Coronado, Lynnwood, WA (US); Richard P. Whitlock, Seattle, WA (US); Haftom Y. Dessalegn, Mountlake Terrace, WA (US); Julie M. Drexler, Brier, WA (US)

(73) Assignee: The Boeing Company, Chicago, IL (US)

( * ) Notice: Subject to any disclaimer, the term of this patent is extended or adjusted under 35 U.S.C. 154(b) by 127 days.

(21) Appl. No.: 15/714,131

(22) Filed: Sep. 25, 2017

(65) Prior Publication Data

US 2019/0097407 A1   Mar. 28, 2019

(51) Int. Cl.
*F16B 43/02* (2006.01)
*H02G 13/00* (2006.01)
*F16B 43/00* (2006.01)
*F16B 41/00* (2006.01)
*B64D 45/02* (2006.01)

(52) U.S. Cl.
CPC ........... *H02G 13/80* (2013.01); *F16B 41/002* (2013.01); *F16B 43/001* (2013.01); *B64D 45/02* (2013.01)

(58) Field of Classification Search
USPC ....................................................... 411/542
See application file for complete search history.

(56) References Cited

U.S. PATENT DOCUMENTS

| 2,983,534 | A | * | 5/1961 | Heller | ..................... | F16B 39/24 |
| | | | | | | 411/301 |
| 3,170,701 | A | | 2/1965 | Hoover | | |
| 3,606,357 | A | * | 9/1971 | Yonkers | ................ | F16B 43/001 |
| | | | | | | 411/537 |
| 3,661,046 | A | * | 5/1972 | Waud | ................... | F16B 25/0021 |
| | | | | | | 411/369 |
| 3,726,178 | A | * | 4/1973 | Dimitry | ................ | F16B 43/001 |
| | | | | | | 411/371.1 |
| 4,191,389 | A | * | 3/1980 | Jelinek | .................. | F16B 43/001 |
| | | | | | | 277/637 |

(Continued)

FOREIGN PATENT DOCUMENTS

| EP | 0177709 A1 | 4/1986 |
| EP | 0486869 A1 | 5/1992 |
| JP | S62133019 U | 8/1987 |

*Primary Examiner* — Gary W Estremsky
(74) *Attorney, Agent, or Firm* — Feliz L. Fischer

(57) ABSTRACT

A dual protection inner seal washer employs a radially outward metallic portion having a dielectric coating and a radially inward polymeric portion engaging the metallic portion at an interface with an interference fit. The polymeric portion has at least one tapering compression surface to engage a surface of a structure proximate a hole and further has a fastener element contact surface to engage a mating surface on a fastener system element. Torqueing of the fastener element compresses the at least one compression surface inducing a predetermined pressure in the polymeric portion in a joint created by the fastener element and structure.

20 Claims, 8 Drawing Sheets

(56) References Cited

U.S. PATENT DOCUMENTS

| | | | | |
|---|---|---|---|---|
| 4,230,326 A | * | 10/1980 | White | B02C 17/22 |
| | | | | 16/2.2 |
| 4,280,390 A | * | 7/1981 | Murray | F16B 43/001 |
| | | | | 411/542 |
| 4,292,876 A | * | 10/1981 | De Graan | F16B 43/001 |
| | | | | 411/369 |
| 4,630,168 A | | 12/1986 | Hunt | |
| 4,702,657 A | * | 10/1987 | Jelinek | F16J 15/00 |
| | | | | 411/369 |
| 4,712,802 A | * | 12/1987 | Hewison | F16B 43/001 |
| | | | | 411/542 |
| 5,193,960 A | * | 3/1993 | Fukushima | E21D 11/083 |
| | | | | 277/637 |
| 7,599,164 B2 | | 10/2009 | Heeter et al. | |
| 7,755,876 B2 | | 7/2010 | Morrill et al. | |
| 7,936,550 B2 | | 5/2011 | Morrill et al. | |
| 9,291,187 B2 | | 3/2016 | Whitlock et al. | |
| 9,611,052 B2 | * | 4/2017 | Whitlock | B64D 45/02 |
| 2015/0377279 A1 | * | 12/2015 | Tanner | B64D 45/02 |
| | | | | 29/525.02 |

* cited by examiner

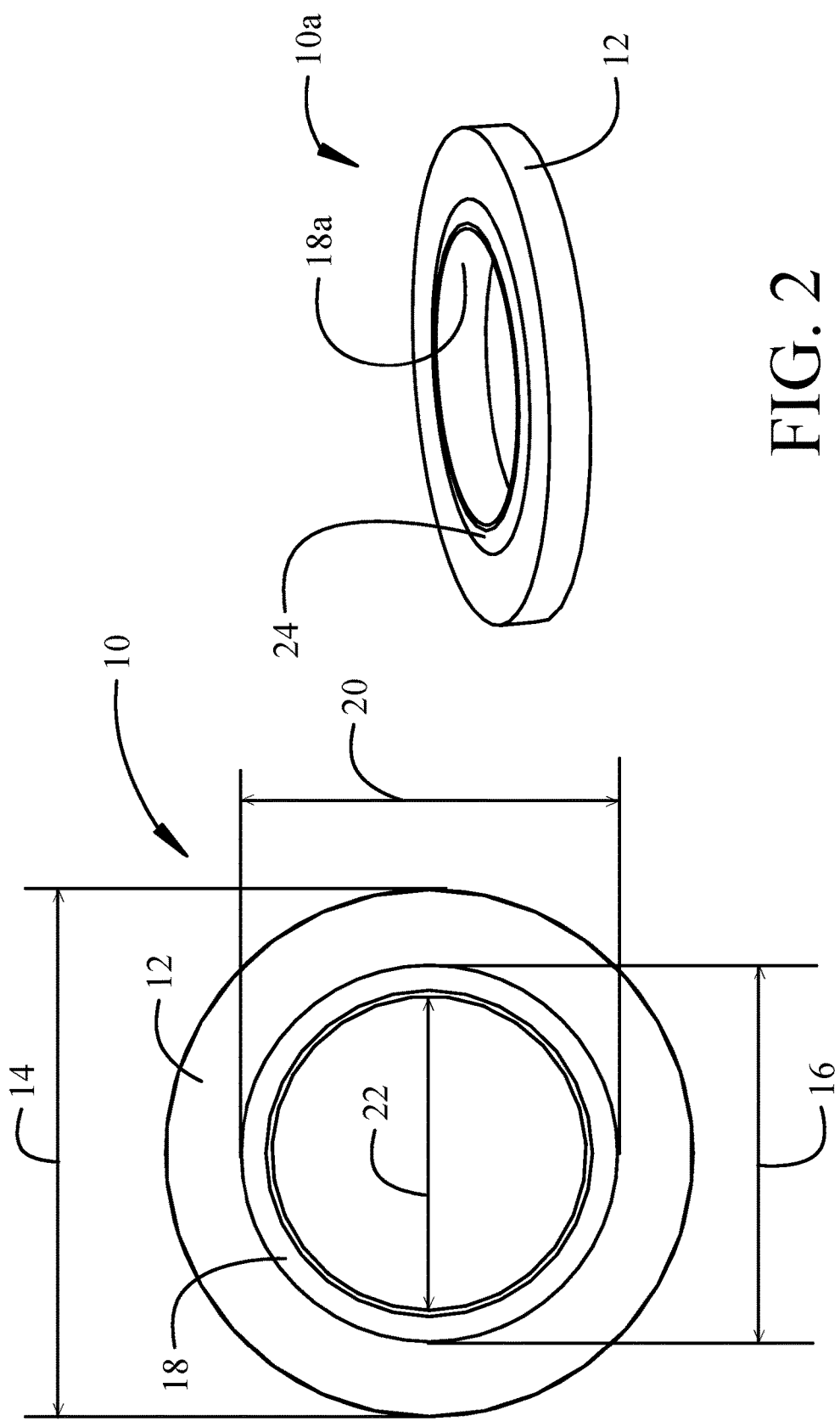

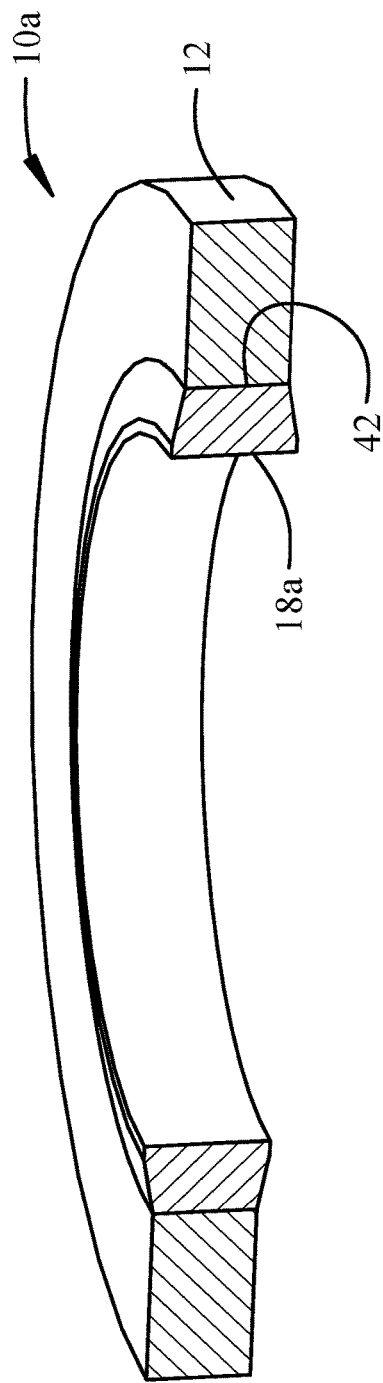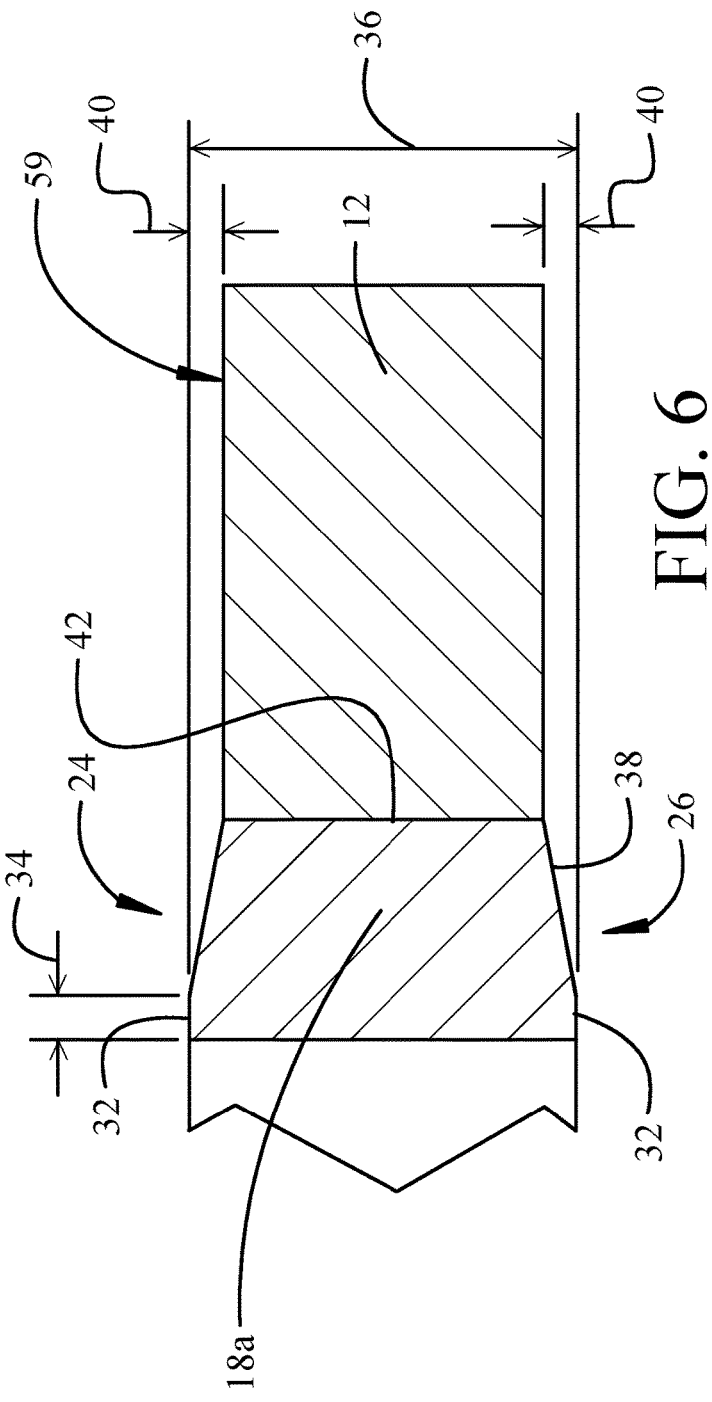

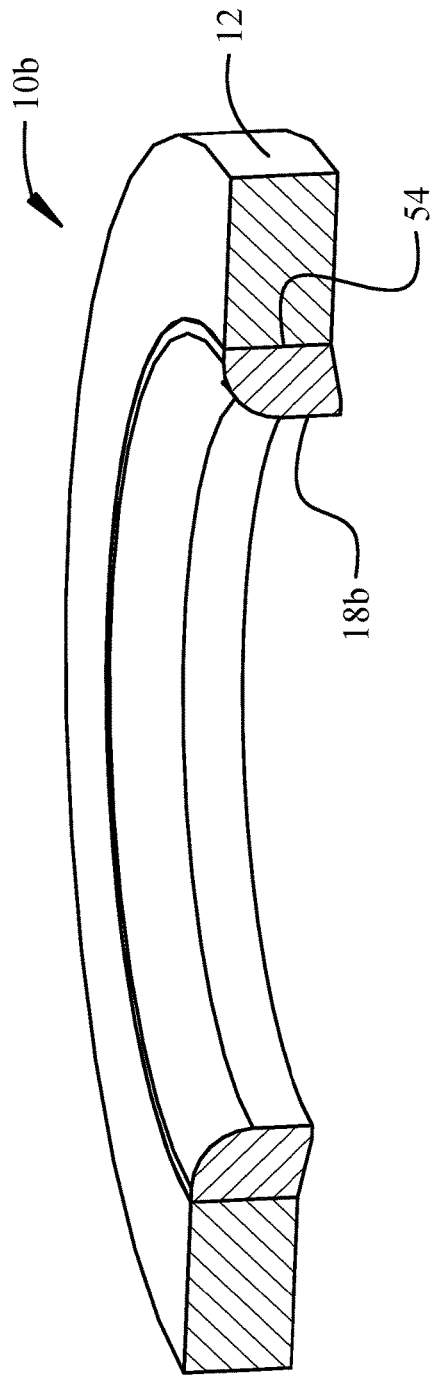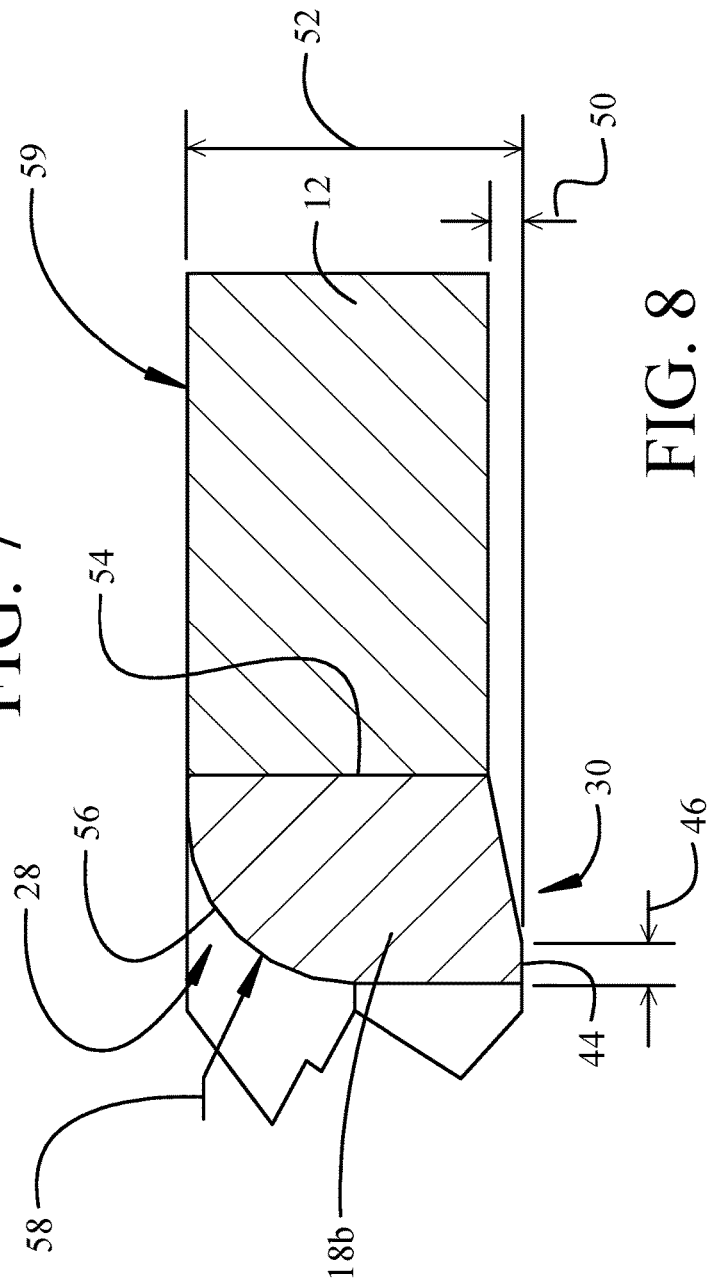

DUAL PROTECTION INNER SEAL WASHER FOR ELECTROMAGNETIC EFFECTS (EME) FASTENERS

BACKGROUND INFORMATION

Field

Embodiments of the disclosure relate generally to sealing of fasteners for improvement of lightning protection and more particularly to embodiments of a washer having a polymer/elastomer seal integrated with a washer.

Background

Composite structures in aircraft provide significant weight reduction and performance improvements. However, the reduced conductivity of composites, particularly in skins or other surface applications may create issues with respect to electromagnetic effects (EME) with regard to lightning protection, particularly where metallic fasteners are employed.

When lightning strikes a carbon fiber reinforced plastic (CFRP) structure, a significant portion of the current may pass into nearby structures through fasteners. When the electrical energy passes between two surfaces, contact resistance heating may break down the materials and generate hot gas (or plasma) in the hole, or in the space in-between the fastener and nut. If the pressure generated is large enough, the gas may find a low pressure path, and escape from the fastener system. That path is sometimes in the surface under the protruding fastener head. These escaping gasses may be hot enough to erode the metal parts (fastener or structure) as they escape, creating particles or droplets.

Arcing between the outer surface of a fastener head and structure or fastener sleeve may also occur. As lightning strike electrical energy is conducted between structural joints, the energy passes through the metallic fasteners. The protruding fastener head of certain fasteners have experienced arcing between the fastener head edge and structure in contact with the head. The arcing may be present between fastener head and the structure, or the fastener head and sleeve if a sleeved fastener is being used.

A preferred solution in the prior art is the use of pre-molded sealant caps. The caps must be specifically manufactured and multiple installation steps are required including individual cleaning and preparation of fastener heads. The caps are installed to fasteners heads using liquid sealant which then must cure. These prior art solutions may result in undesirable additional cost and weight.

SUMMARY

Exemplary embodiments provide a dual protection inner seal washer which incorporates a radially outward metallic portion having a dielectric coating and a radially inward polymeric portion engaging the metallic portion at an interface with an interference fit. The polymeric portion has at least one tapering compression surface to engage a surface of a structure proximate a hole and further has a fastener element contact surface to engage a mating surface on a fastener system element. Torqueing of the fastener element compresses the at least one compression surface inducing a predetermined pressure in the polymeric portion in a joint created by the fastener element and structure.

A fastener system is accommodated by the embodiments wherein a fastener having a head, a shaft and a threaded end is received in a hole in a structure. A nut is received on the threaded end and a first dual protection inner seal washer, received on the shaft intermediate the head and a first surface of the structure, has a radially outward metallic portion with a dielectric coating and a radially inward polymeric portion engaging the metallic portion at an interface with an interference fit. The polymeric portion has a tapering compression surface to engage the first surface proximate the hole and has a fastener element contact surface to engage a mating surface on the fastener head. A second dual protection inner seal washer, received on the shaft intermediate a second surface of the structure and the nut, has a radially outward metallic portion with a dielectric coating and a radially inward polymeric portion engaging the metallic portion at an interface with an interference fit. The polymeric portion has a first tapering compression surface to engage a surface of a structure proximate the hole and a second tapering compression surface to engage a surface of the nut. Torqueing of the fastener and nut compresses the tapering compression surface of the first dual protection inner seal washer and the first and second tapering compression surfaces of the second dual protection inner seal washer, inducing a predetermined pressure in the polymeric portion of the first dual protection inner seal washer and the polymeric portion of the second dual protection inner seal washer in a joint created by the fastener, nut and structure.

The embodiments allow a method for enhanced electromagnetic effects protection in a joint. A fastener is inserted through a fastener side dual protection inner seal washer having a radially outward metallic portion and a radially inward polymeric portion with at least one compression surface and an engagement surface to engage the fastener. A shaft of the fastener is inserted into a hole in a structure, the dual protection inner seal washer engaging a first surface of the structure adjacent the hole with the compression surface. A nut side dual protection inner seal washer having a radially outward metallic portion and a radially inward polymeric portion with a first compression surface and a second compression surface is received over a threaded end of the fastener with the first compression surface engaging a second surface of the structure adjacent the hole. A nut is received on the threaded end of the fastener engaging the second compression surface. The nut and fastener are then torqued to compress the at least one compression surface of the fastener side dual protection inner seal washer and the first and second compression surfaces of the nut side dual protection inner seal washer to create a predetermined increased pressure in the joint.

BRIEF DESCRIPTION OF THE DRAWINGS

The features, functions, and advantages that have been discussed can be achieved independently in various embodiments of the present invention or may be combined in yet other embodiments further details of which can be seen with reference to the following description and drawings.

FIG. 1 shows a top view of an exemplary embodiment of a dual protection inner seal washer;

FIG. 2 is a pictorial representation of a nut side dual protection inner seal washer;

FIG. 5 is a sectioned perspective of the nut side dual protection inner seal washer;

FIG. 6 is a detail section view of the nut side dual protection inner seal washer;

FIG. 7 is a sectioned perspective of the fastener side dual protection inner seal washer;

FIG. 8 is a detail section view of the fastener side dual protection inner seal washer;

DETAILED DESCRIPTION

Figure 3:
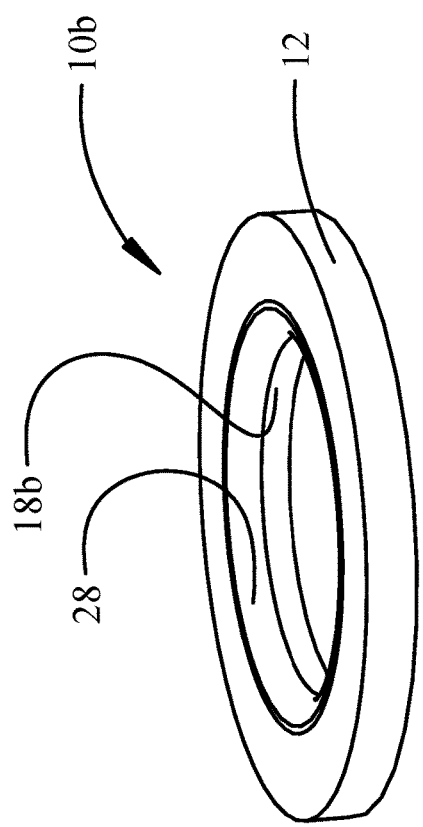
FIG. 3 is an upper perspective representation of a fastener side dual protection inner seal washer.

The embodiments described herein provide dual protection inner seal washers for both nut side and head side application on fasteners. The washers employ a radially outward metallic portion and a radially inward polymeric portion which is press fit within an inner diameter of the metallic portion. The metallic portion incorporates a high dielectric coating. The polymeric portion is tapered with a thickened portion at the inner diameter which deforms under compression induced by torqueing the fastener system elements (fastener and nut) to create a seal. Dimensioning of the taper in the polymeric portion provides that when the joint created by the fastener system and structure is tightened, the polymeric portion exerts force inward to a shank of the fastener, outward to the ID of the metallic portion, laterally against the fastener head or nut surface and the structure until there is no longer available space for the polymer to flow and further compression creates a predetermined increased pressure in the joint. The polymeric portion is compressed to a state to act as an incompressible fluid and create a high pressure zone between the surfaces of the fastener system (fastener and nut) and the structure. A volumetric compression of 30% to 75% based on diameter size of washers achieves the desired properties in the polymeric portions. The pressure of the polymeric portion creates a wave front in the structural joint. The structure along the hole and outward of ~0.010" contains the most force in the joint with pressure dissipating slightly until only the structure, metallic portion of the washer and fastener body are left. This increased force zone/pressure wave contains the high energy occurrence that builds during a lightning strike. The increased force zone of the fastened joint is greater than that of the lightning caused pressure build up. As the electrical energy dissipates and the joint starts to cool the lightning caused pressures subsides without having been vented.

During a lightning strike or other EME event, the highly dielectric material in the coating of the metallic portion prevents arcing between elements in the vicinity of the seal. Lightning strikes generate hot gas/plasma in the fastener holes. Localized high pressure contact by the polymeric portion and the adjacent elements of the joint resists escape of any hot gas/plasma past the seal. Additionally, as high pressure gas attempts to escape from between the fastener and the hole of the structure the gas contacts the polymeric portion and high pressure zone created by the compressed polymeric portion, causing pressure spikes, which can generate cracks in the composite structure. Without the presence of the dual protection inner seal washer those cracks may occur near the surface, and when reaching the surface, vent the gas while it is still incandescent (hot). High contact pressure generated by the seal assists in preventing cracks near the surface. Thus the cracks occur deeper in the structure, reducing the number that reach the surface, and making the travel distance in the cracks longer for the gas to reach the surface, allowing the gas to cool down before venting.

Referring to the drawings, FIG. 1 shows an exemplary embodiment of a dual protection inner seal washer 10. A radially outward metallic portion 12 having an outer diameter (OD) 14 and an inner diameter (ID) 16 surrounds a radially inward polymeric portion 18 having an outer diameter 20 and an inner diameter 22.

Figure 4:
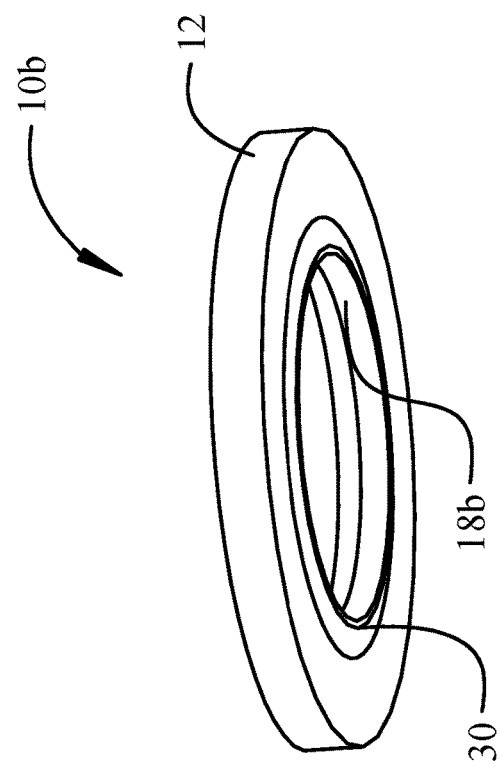
FIG. 4 is a lower perspective representation of the fastener side dual protection inner seal washer.

A nut side dual protection inner seal washer 10a is shown in FIG. 2 and employs symmetrical tapered surfaces 24, 26 on the polymeric portion 18a (to be described in greater detail subsequently); one to contact a nut surface and the second to contact a surface of a structure. A fastener side dual protection inner seal washer 10b is shown in FIG. 3, demonstrating a fastener contact surface while FIG. 4 shows the structure contact surface. The polymeric portion 18b has a filleted contact surface 28 (to be described in greater detail subsequently) on a fastener contact side and a tapered surface 30 (to be described in greater detail subsequently) on the structure contact side.

Details of the nut side dual protection inner seal washer embodiment are shown in FIGS. 5 and 6. The symmetrical tapered surfaces 24, 26 of the polymeric portion 18a of the dual protection inner seal washer 10a incorporate initial contact surfaces 32 proximate the ID of the polymeric portion and having a radial width 34. Tapering segments 38 decrease thickness of the polymeric portion 18a radially outwardly from the initial contact surfaces 32 by a compression dimension 40 to engage the metallic portion 12 having a thickness 36 with an interference fit at an interface 42. In exemplary embodiments, an as molded OD of the polymeric portion 18a is 0.0000" to 0.0050" larger than the ID 16 of the metallic portion 12 to provide the desired retention.

For exemplary embodiments, polymeric portion 18a employs high strength polymer having flexural strength of 16 ksi-30 ksi and compressive strength of 18 ksi-40 ksi. Examples of suitable polymers include polyamide-imide (PAI) such as Torlon® available from Solvay Specialty Polymers, 30% glass-filled PAI, 30% glass-filled Polyether Ether Ketone (PEEK), 20% glass-filled PEEK, 10% glass-filled PEEK, unfilled PEEK, Polyphenylene Sulfide (PPS) or Polyetherimide (PEI). With the example high strength polymers exemplary compression dimension 40 is 0.010+0.005−0.000" and initial contact width 34 is 0.015±0.005" in exemplary embodiments. As a ratio, polymeric portion ID 22 to metallic portion ID 16 ranges from 1.2 to 1.3 for varying washer size. Thickness 36 is established to provide a substantially consistent volumetric compression factor based on the compression dimension 40 to establish the predetermined pressure in the joint as previously described Details of the fastener side dual protection inner seal washer 10b are shown in FIGS. 7 and 8. Unlike the nut side washer, the fastener side dual protection inner seal washer 10b employs a polymeric portion 18b having a first tapered surface 30 to engage a surface of the structure (to be described in greater detail subsequently) with an initial contact surface 44 having a radial width 46. A tapering segment 48 decreases thickness of the polymeric portion 18b radially outwardly from the initial contact surfaces 44 by a compression dimension 50 to engage the metallic portion 12 having a thickness 52 with an interference fit at an interface 54. In exemplary embodiments, an as molded OD of the polymeric portion 18b is 0.0000" to 0.0050" larger than the ID 16 of the metallic portion 12 to provide the desired retention. A filleted engagement surface 56 having a radius 58 is provided on the polymeric portion 18b to allow complimentary engagement of mating surface such as a fillet on the fastener head (as will be described in greater detail subsequently). For exemplary embodiments, radius 58 is between 0.0001" to 0.0300" less than a fillet radius on the mating fastener (to be described in greater detail subsequently). The radius 58 being a smaller radius than that of the bolt shank to head fillet 78 (discussed subsequently with respect to FIG. 9) creates an interference and compression between the two interfaces.

In exemplary embodiments, the polymeric portion 18b employs comparable high strength polymers as described with respect to the nut side washer above with an exemplary compression dimension 50 of 0.010+0.005−0.000" and initial contact width 46 of 0.015±0.005". As a ratio, polymeric portion ID 22 to metallic portion ID 16 ranges from 1.2 to 1.3 for varying washer size. Thickness 52 is established to provide a substantially consistent volumetric compression factor based on the compression dimension 50 with reaction of the filleted outer surface 56 on the fastener fillet to establish the predetermined pressure in the joint as previously described.

While shown in the exemplary embodiments as linear, tapered segments 38 and 48 may be curved or arcuate in alternative embodiments.

For both the nut side and fastener side dual protection inner seal washers 10a and 10b, a dielectric coating (represented as element 59 in the drawings) is applied to all surfaces of the metallic portions 12 of the washers. The dielectric coating provides a Dielectric Breakdown Voltage greater than 100 Volts/Mil. In exemplary embodiments, a dielectric such as phenolic based paint or epoxy resin based paint with a thickness of 0.0002" to 0.0010" or an epoxy resin based paint applied in two coats resulting in a thickness of 0.0005" to 0.0020", is employed. A typical and preferred curable organic dielectric coating has phenolic resin mixed with one or more plasticizers, other organic components such as polytetrafluoroethylene, and inorganic additives such as aluminum powder. These coating components are preferably dissolved in a suitable solvent present in an amount to produce a desired application consistency. In accordance with some embodiments, the coating material is dissolved in a solvent that is a mixture of ethanol, toluene, and methyl ethyl ketone. A typical sprayable coating solution has about 30 wt. % ethanol, about 7 wt. % toluene, and about 45 wt. % methyl ethyl ketone as the solvent; and about 2 wt. % strontium chromate, about 2 wt. % aluminum powder, with the balance being phenolic resin and plasticizer as the coating material. A small amount of polytetrafluoroethylene may optionally be added. One suitable coating is HI-KOTE™ 1, which is commercially available from LISI Aerospace. The HI-KOTE™ 1 coating material is typically cured at an elevated temperature between 350-450° F. for 1 hour to 4 hours. The heavier elements are present in an exemplary embodiment in the following amounts by weight: Al, 82.4%; Cr, 2.9%; Fe, 0.1%; Zn, 0.7%; and Sr, 13.9%.

Figure 9:
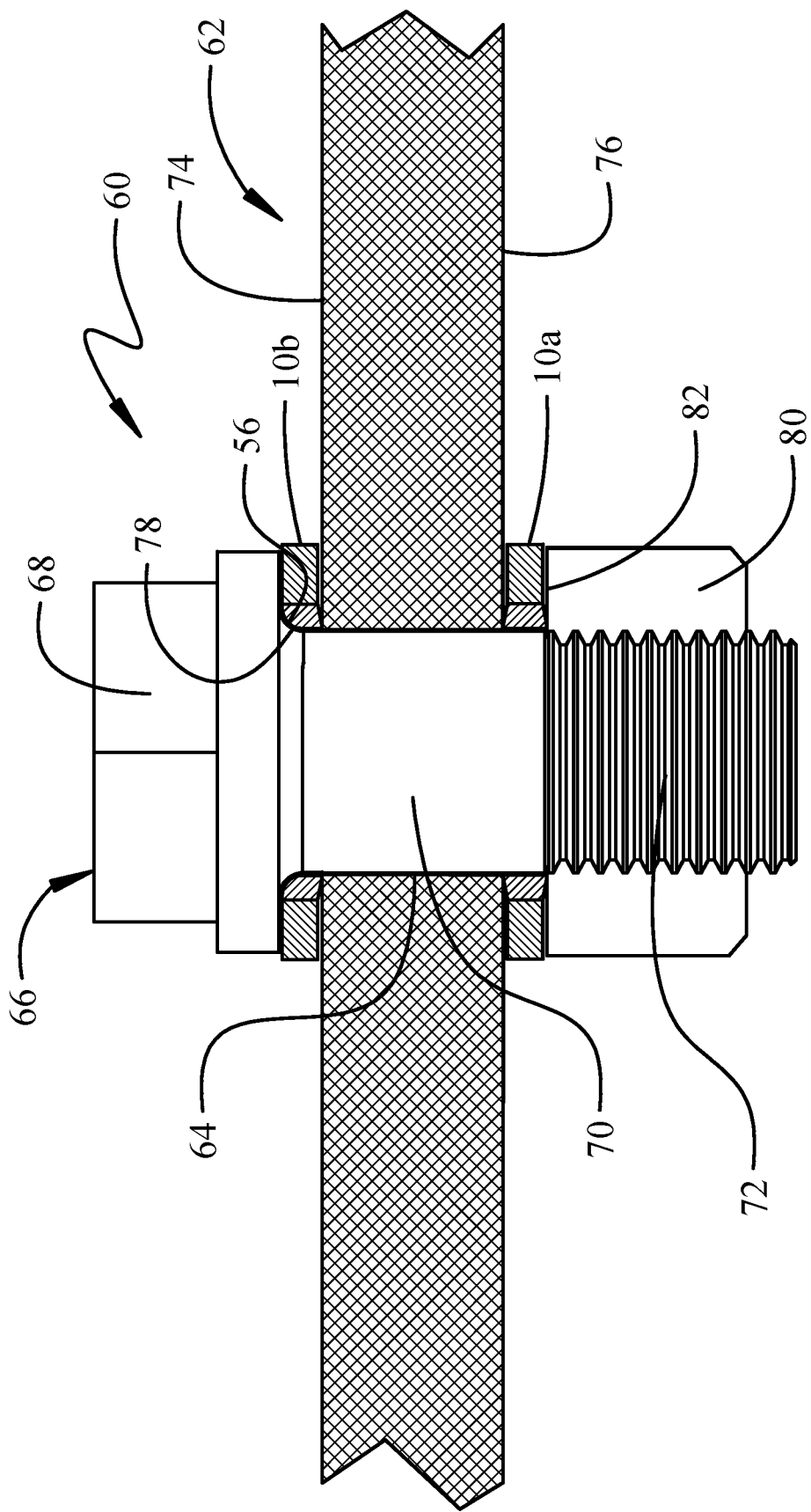
FIG. 9 is a section view of an exemplary joint with a fastener system employing the fastener side and nut side dual protection inner seal washers with a fastener and nut.

A complete fastener system 60 is shown in FIG. 9 creating a joint in a structure 62 (shown as a unitary element in the drawings but may be multiple layers or joined structural elements) with a hole 64. A fastener 66, having a head 68 attached to a shaft 70 with a threaded end 72, extends through a fastener side dual protection seal washer 10b engaging a first surface 74 of the structure 62 and a nut side dual protection seal washer 10a engaging a second surface 76. The filleted outer surface 56 of the fastener side dual protection seal washer 10b has a complimentary radius to engage a fillet 78 at the interface of the fastener head 68 and shaft 70. A nut 80 is engaged on the threaded end 72 and engages the nut side dual protection seal washer 10a with a surface 82. As previously described, torqueing of the fastener system 60 engages the fillet 78 in fastener 66 with the filleted outer surface 56 on fastener side dual protection seal washer 10b and initial contact surface 44 with the structure surface 74 while initial contact surfaces 32 on symmetrical tapered surfaces 24, 26 of the nut side dual protection seal washer 10a engage the structure surface 76 and nut surface 82, respectively. Compression of the polymeric portions induces the predetermined increased pressure in the joint created by the fastener system 60. The dielectric coating 59, previously described, provides a barrier between the metallic surfaces of fastener system 60 and the structure surfaces 74, 76 thereby preventing any arcing at the edge of the nut, washer, or fastener head and the structure.

The filleted outer surface 56 on the polymeric portion 18b of the fastener side dual protection seal washer 10b eliminates the need for countersinking of the hole 64 to accommodate the fillet of the fastener 66.

Figure 10:
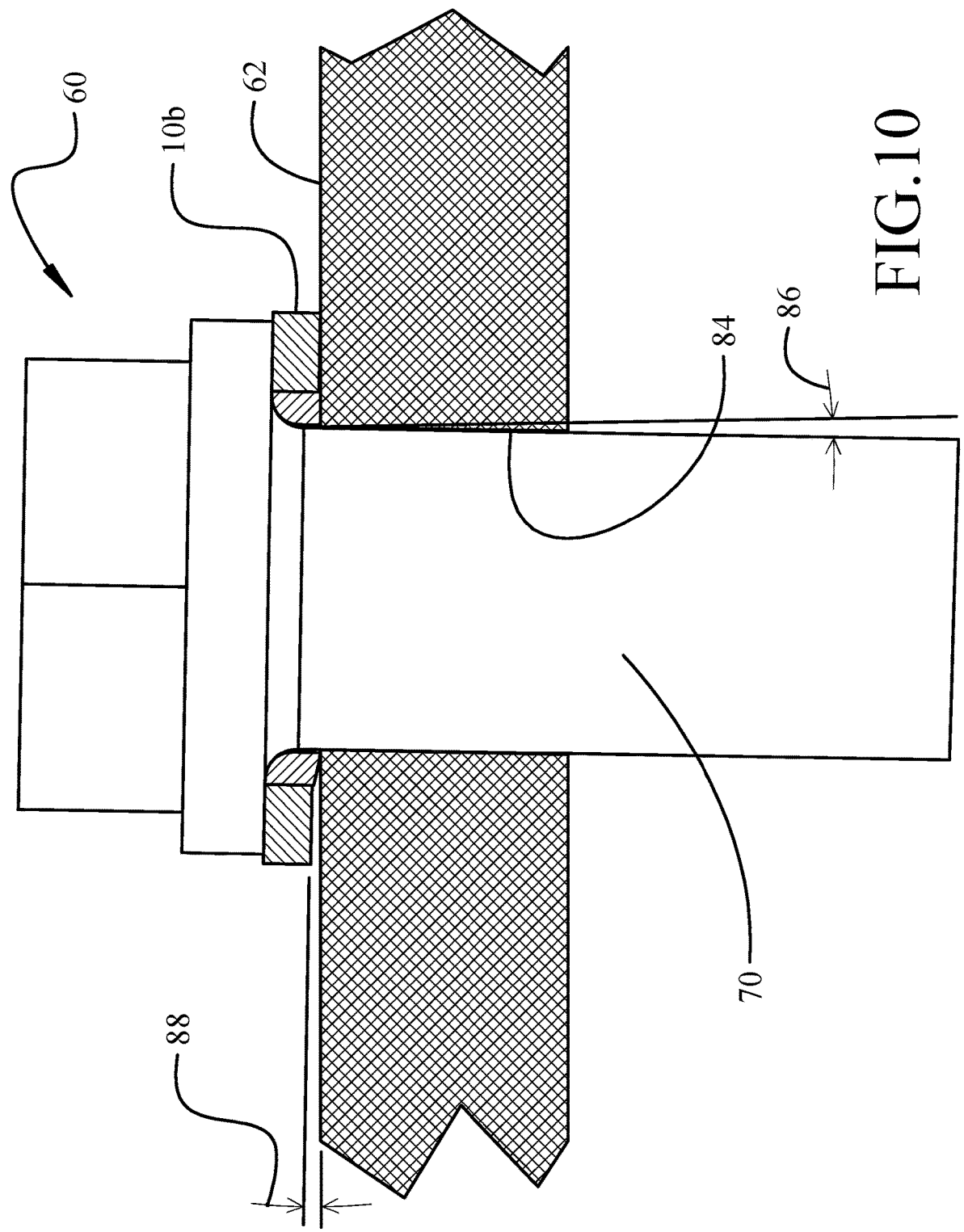
FIG. 10 is a section view of and exemplary joint with an angularly misaligned hole.
Figure 11:
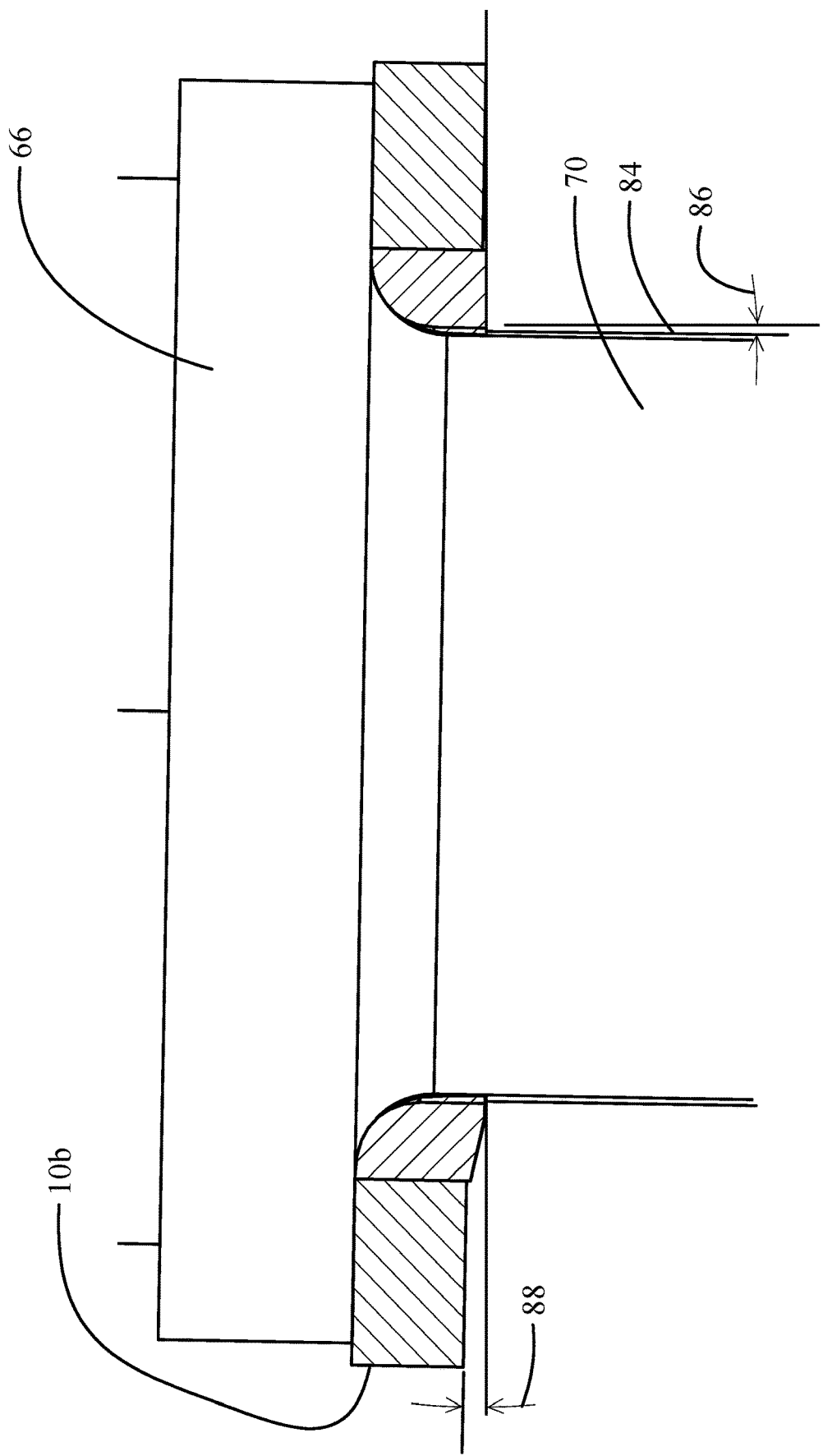
FIG. 11 is a detailed view of the exemplary joint with an angularly misaligned hole; and, FIG. 12 is a flow chart of a method for sealing a fastener and nut in a joint for enhanced EME protection.

The geometric configuration of the dual protection seal washers 10a, 10b additionally allows the fastener system 60 to accommodate angular misalignment of the hole 64. As seen in FIGS. 10 and 11, tolerances on perpendicularity of holes in a joint may create an angularly misaligned hole 84 with an angle 86 relative to the structure 62 through which the hole extends. This angular offset produces a complimentary offset angle 88 in the fastener system 60 due to alignment of the fastener shaft 70 in the holed 84. While typical allowable hole angular tolerance is about 2°, the exemplary embodiments of the fastener side and nut side dual inner seal protection washers 10a, 10b allow an angular offset of up to 7° while maintaining the required compression for seal effectiveness based on the dimensioning of the tapered segment 38 and 48 in the polymeric seal portions 18a, 18b.

Figure 12:
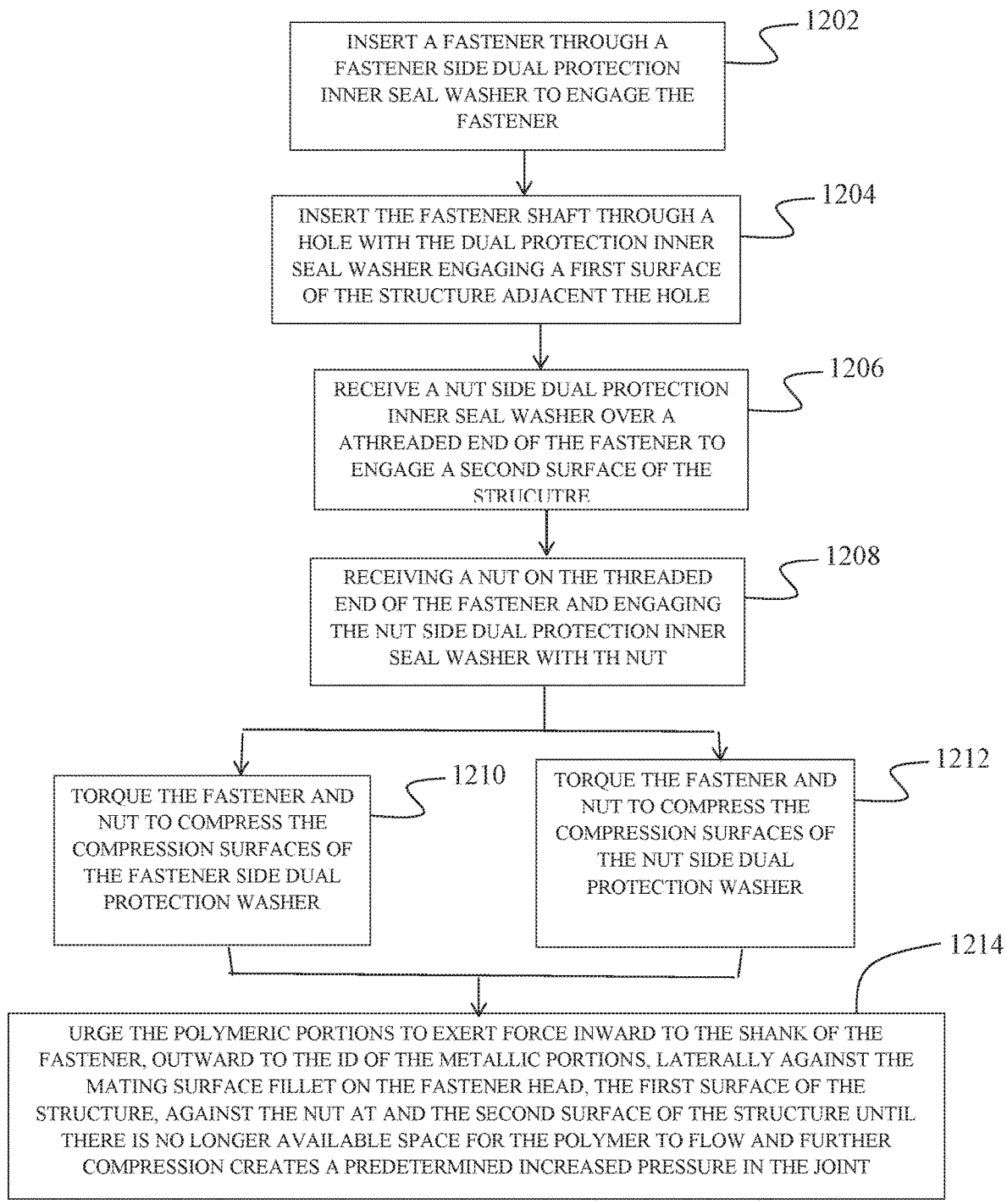

The embodiments disclosed for the dual inner seal protection inner seal washers allow a method for enhanced EME protection as shown in FIG. 12 A fastener 66 is inserted through a fastener side dual protection inner seal washer 10b having a radially outward metallic portion 12 and a radially inward polymeric portion 18b with at least one compression surface 30 and an engagement surface 28 to engage the fastener, step 1202. The fastener shaft 70 is inserted into a hole 64 in a structure 62, the dual protection inner seal washer engaging a first surface 74 of the structure adjacent the hole with the compression surface 30, step 1204. A nut side dual protection inner seal washer having a radially outward metallic portion 12 and a radially inward polymeric portion 18a with a first compression surface 24 and a second compression surface 26 is received over a threaded end 72 of the fastener 66 with the first compression surface 24 engaging a second surface 76 of the structure adjacent the hole 64, step 1206. A nut 80 is received on the threaded end 72 of the fastener and engages the second compression surface 26, step 1208. The nut and fastener are torqued to compress at least one of the compression surfaces of the fastener side dual protection inner seal washer, step 1210, and the first and second compression surfaces of the nut side dual protection inner seal washer, step 1212, the compression of one or both compression surfaces 30 urging the polymeric portion 18b to exert force inward to a shank of the fastener, outward to the ID of the metallic portion, laterally against the mating surface fillet 78 on fastener head 68 and the first surface 74 of the structure until there is no longer available space for the polymer to flow and further compression creates a predetermined increased pressure in the joint and the compression of the first and second compression surfaces 24, 26 urging the polymeric portion 18*a* to exert force inward to the shaft 70 of the fastener 66, outward to the ID of the metallic portion, laterally against the nut 80 at surface 82 and the second surface 76 of the structure 62 until there is no longer available space for the polymer to flow and further compression creates a predetermined increased pressure in the joint, step 1214.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A dual protection inner seal washer comprising:
    a radially outward metallic portion having a dielectric coating;
    a radially inward polymeric portion employing a high strength polymer engaging the metallic portion at an interface with an interference fit, said polymeric portion having at least one tapering compression surface to engage a surface of a structure proximate a hole, said at least one tapering compression surface extending radially inward from the interface and having a fastener element contact surface to engage a mating surface on a fastener system element, wherein torqueing of the fastener system element compresses the at least one tapering compression surface inducing a predetermined pressure in the radially inward polymeric portion in a joint created by the fastener system element and structure.

2. The dual protection inner seal washer as defined in claim 1 wherein the at least one tapering compression surface comprises an initial contact surfaces having a radial width proximate an inner diameter (ID) of the radially inward polymeric portion wherein tapering segments decrease thickness of the polymeric portion from the initial contact surfaces by a compression dimension to engage a thickness of the metallic portion.

3. The dual protection inner seal washer as defined in claim 2 wherein the tapering segment extends from the initial contact surface to an outer diameter (OD) of the radially inward polymeric portion.

4. The dual protection inner seal washer as defined in claim 1 wherein the fastener system element is a nut and the fastener element contact surface comprises a second tapering compression surface.

5. The dual protection inner seal washer as defined in claim 1 wherein the fastener system element is a fastener and the fastener element contact surface comprises an engagement surface configured for complimentary engagement of a mating surface on the fastener.

6. The dual protection inner seal washer as defined in claim 5 wherein the mating surface is a fillet and the engagement surface comprises a filleted outer surface having a complimentary radius to engage the fillet.

7. The dual protection inner seal washer as defined in claim 1 wherein the radially inward polymeric portion comprises a high strength polymer having flexural strength of 16 ksi-30 ksi and compressive strength of 18 ksi-40 ksi.

8. The dual protection inner seal washer as defined in claim 7 wherein the high strength polymer is selected from polyamide-imide (PAI), 30% glass-filled PAI, 30% glass-filled Polyether Ether Ketone (PEEK), 20% glass-filled PEEK, 10% glass-filled PEEK, unfilled PEEK, Polyphenylene Sulfide (PPS) or Polyetherimide (PEI).

9. The dual protection inner seal washer as defined in claim 7 wherein the at least one tapering compression surface has a compression dimension of 0.010+0.005−0.000".

10. The dual protection inner seal washer as defined in claim 7 wherein a volumetric compression of the radially inward polymeric portion of 30% to 75% achieves the predetermined pressure.

11. The dual protection inner seal washer as defined in claim 1 wherein the dielectric coating has a Dielectric Breakdown Voltage greater than 100 Volts/Mil.

12. The dual protection inner seal washer as defined in claim 11 wherein the dielectric coating is a phenolic based paint or an epoxy resin based paint.

13. A fastener system comprising:
    a fastener having a head, a shaft and a threaded end, said shaft and threaded end configured to be received in a hole in a structure;
    a nut received on the threaded end
    a first dual protection inner seal washer, received on the shaft intermediate the head and a first surface of the structure, having
        a radially outward metallic portion with a dielectric coating;
        a radially inward polymeric portion employing a high strength polymer engaging the radially outward metallic portion at an interface with an interference fit, said radially inward polymeric portion extending radially inward from the interface and having a tapering compression surface to engage the first surface proximate the hole and having a fastener element contact surface to engage a mating surface on the fastener head;
    a second dual protection inner seal washer, received on the shaft intermediate a second surface of the structure and the nut, having
        a radially outward metallic portion with a dielectric coating;
        a radially inward polymeric portion employing a high strength polymer engaging the metallic portion at an interface with an interference fit, said polymeric portion extending radially inward from the interface and having a first tapering compression surface to engage a surface of a structure proximate the hole and a second tapering compression surface to engage a surface of the nut;
    wherein torqueing of the fastener and nut compresses the tapering compression surface of the first dual protection inner seal washer and the first and second tapering compression surfaces of the second dual protection inner seal washer, inducing a predetermined pressure in the radially inward polymeric portion of the first dual protection inner seal washer and the radially inward polymeric portion of the second dual protection inner seal washer in a joint created by the fastener, nut and structure.

14. The fastener system as defined in claim 13 wherein the tapering compression surface, first tapering compression surface and second tapering compression surface each comprise an initial contact surface having a radial width proximate an inner diameter (ID) of the polymeric portion, wherein tapering segments decrease thickness of the polymeric portion from the initial contact surfaces by a compression dimension to engage a thickness of the metallic portion.

15. The fastener system as defined in claim 14 wherein tapering segment extends from the initial contact surface to an outer diameter (OD) of the polymeric portion.

16. The fastener system as defined in claim 13 wherein the polymeric portion comprises a high strength polymer having flexural strength of 16 ksi-30 ksi and compressive strength of 18 ksi-40 ksi.

17. The fastener system as defined in claim 16 wherein the tapering compression surface has a compression dimension of 0.010+0.005−0.000".

18. A method for enhanced electromagnetic effects protection in a joint, said method comprising:
  inserting a fastener through a fastener side dual protection inner seal washer having a radially outward metallic portion with a dielectric coating and a radially inward polymeric portion engaging the radially outward metallic portion at an interface with an interference fit said polymeric portion extending radially inward from the interface and having at least one tapering compression surface and an engagement surface to engage the fastener;
  inserting a shaft of the fastener into a hole in a structure, the dual protection inner seal washer engaging a first surface of the structure adjacent the hole with the compression surface;
  receiving a nut side dual protection inner seal washer having a radially outward metallic portion with a dielectric coating and a radially inward polymeric portion engaging the radially outward metallic portion at an interface with an interference fit said polymeric portion extending radially inward from the interface and having a first compression surface and a second compression surface over a threaded end of the fastener with the first compression surface engaging a second surface of the structure adjacent the hole;
  receiving a nut on the threaded end of the fastener engaging the second compression surface;
  torqueing the nut and fastener to compress the at least one compression surface of the fastener side dual protection inner seal washer and the first and second compression surfaces of the nut side dual protection inner seal washer to create a predetermined increased pressure in the joint.

19. The method as defined in claim 18 wherein the step of torqueing further comprises:
  compressing the at least one compression surface urging the polymeric portion of the fastener side dual protection inner seal washer to exert force inward to a shank of the fastener, outward to an inner diameter of the metallic portion, laterally against a mating surface fillet on the fastener and the first surface of the structure until there is no longer available space for the polymer to flow and further compression creates a predetermined increased pressure in the joint.

20. The method as defined in claim 18 where in the step of torqueing further comprises:
  compressing the first and second compression surfaces urging the polymeric portion of the nut side dual protection inner seal washer to exert force inward to the shaft of the fastener, outward to the inner diameter of the metallic portion, laterally against the nut and the second surface of the structure until there is no longer available space for the polymer to flow and further compression creates a predetermined increased pressure in the joint.

* * * * *